(12) United States Patent
Kim et al.

(10) Patent No.: US 11,822,751 B2
(45) Date of Patent: Nov. 21, 2023

(54) ELECTRONIC DEVICE

(71) Applicant: Samsung Display Co., Ltd., Yongin-si (KR)

(72) Inventors: Soowon Kim, Cheonan-si (KR); Jaseung Ku, Yongin-si (KR); Hyungchul Kim, Hwaseong-si (KR); Yerin Oh, Ulsan (KR); Suhyun Jeong, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/647,142

(22) Filed: Jan. 5, 2022

(65) Prior Publication Data

US 2022/0214716 A1 Jul. 7, 2022

(30) Foreign Application Priority Data

Jan. 7, 2021 (KR) .......................... 10-2021-0001992

(51) Int. Cl.
*G06F 3/044* (2006.01)
*H05K 5/00* (2006.01)

(52) U.S. Cl.
CPC .......... *G06F 3/0443* (2019.05); *G06F 3/0446* (2019.05)

(58) Field of Classification Search
None
See application file for complete search history.

(56) References Cited

U.S. PATENT DOCUMENTS

| | | | |
|---|---|---|---|
| 9,349,552 B2 | 5/2016 | Huska et al. | |
| 9,980,373 B2 | 5/2018 | Jeong et al. | |
| 10,645,205 B2 | 5/2020 | Lee | |
| 2014/0210737 A1* | 7/2014 | Hwang | H04M 1/0243 345/173 |
| 2016/0239133 A1* | 8/2016 | Ko | G06F 3/0448 |
| 2017/0192572 A1* | 7/2017 | Han | H10K 59/40 |
| 2018/0067614 A1* | 3/2018 | Hong | G06F 3/0447 |
| 2019/0187843 A1* | 6/2019 | Ye | G06F 3/041 |
| 2021/0311137 A1* | 10/2021 | Chen | G01D 5/145 |

FOREIGN PATENT DOCUMENTS

| | | | |
|---|---|---|---|
| CN | 202887670 U | * | 4/2013 |
| KR | 10-2016-0120399 A | | 10/2016 |
| KR | 10-1871652 B1 | | 6/2018 |
| KR | 10-2019-0094264 A | | 8/2019 |

* cited by examiner

*Primary Examiner* — Duane N Taylor, Jr.
(74) *Attorney, Agent, or Firm* — Lewis Roca Rothgerber Christie LLP

(57) ABSTRACT

An electronic device includes: an electronic panel including a first area, a folding area, and a second area, arranged along a first direction, the folding area being folded with respect to a folding axis defined in a second direction crossing the first direction; a support layer under the electronic panel and comprising a folding portion overlapping the folding area and provided with a plurality of holes defined therethrough, a first portion overlapping the first area, and a second portion overlapping the second area; and a folding sensing module comprising a sensing pad being electrically conductive, a driver configured to apply an electrical signal to the sensing pad, and a sensing line connecting the sensing pad and the driver.

20 Claims, 15 Drawing Sheets

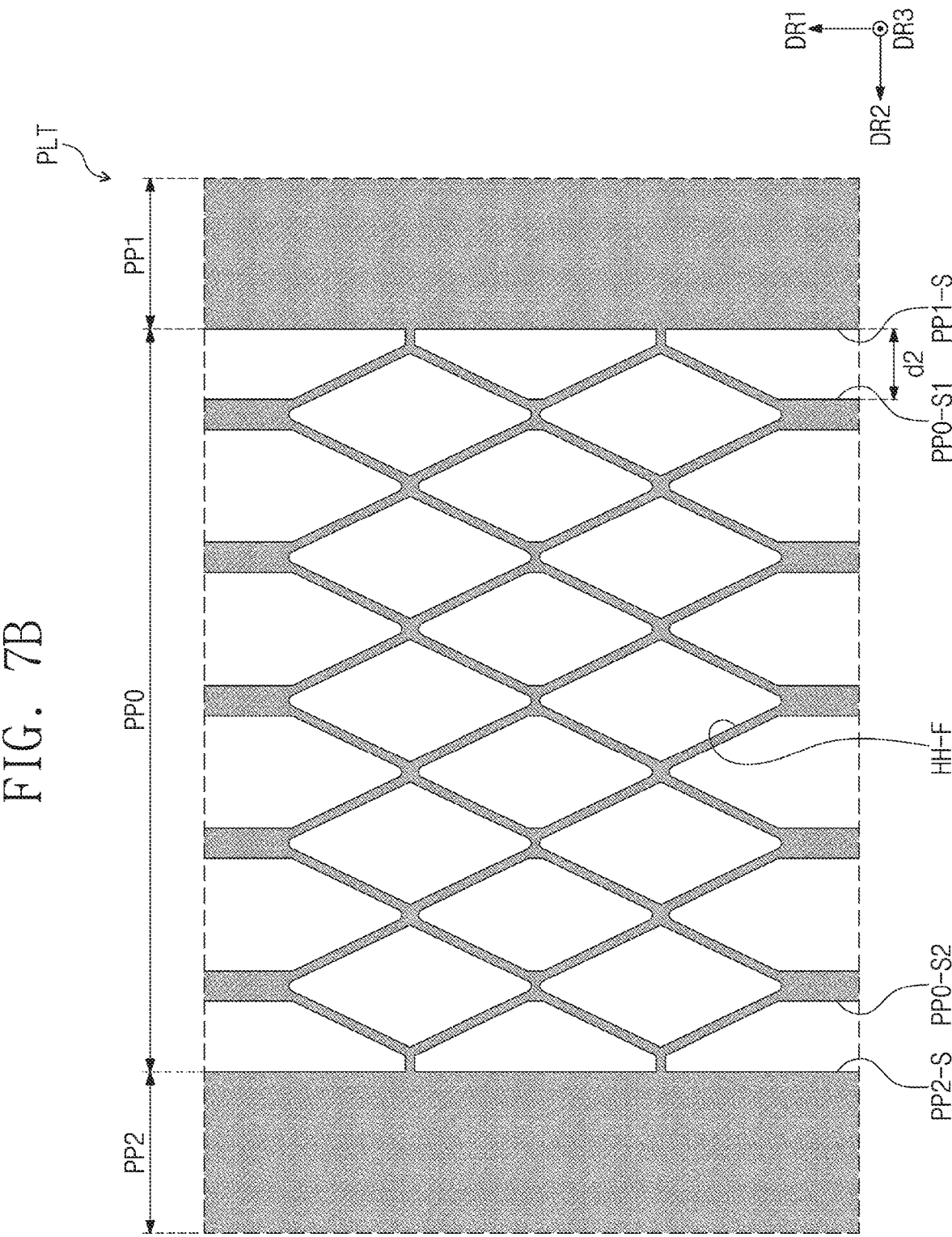

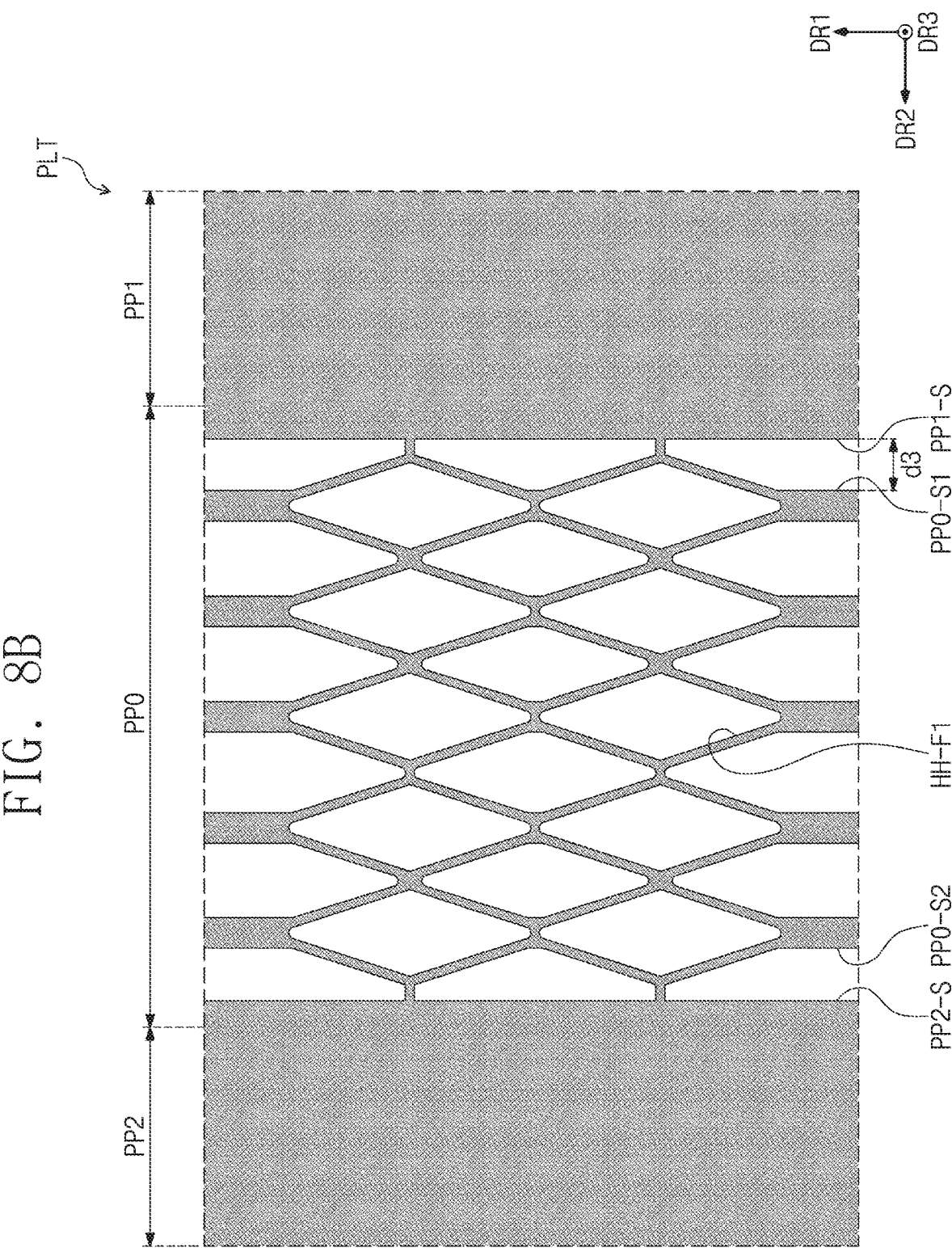

ELECTRONIC DEVICE

CROSS-REFERENCE TO RELATED APPLICATION

This application claims priority to and the benefit of Korean Patent Application No. 10-2021-0001992, filed on Jan. 7, 2021, the contents of which are hereby incorporated by reference in its entirety.

BACKGROUND

1. Field

Aspects of some embodiments of the present disclosure relates to an electronic device.

2. Description of the Related Art

An electronic device includes a display device. The display device includes a display area that is activated in response to electrical signals. A display device may sense an input applied thereto from the outside through the display area (e.g., through a touch sensor at the display area) and at the same time display various images to provide a user with information. In recent years, as display devices having a variety of shapes are being developed, display areas may be implemented in various shapes.

For example, foldable electronic devices using flexible materials are being actively developed. A display device of the foldable electronic device may be folded with respect to a folding axis (e.g., a set or predetermined folding axis), and the display area may be provided in various shapes due to the folding of the display device.

The above information disclosed in this Background section is only for enhancement of understanding of the background and therefore the information discussed in this Background section does not necessarily constitute prior art.

SUMMARY

Aspects of some embodiments of the present disclosure relates to an electronic device. For example, the present disclosure relates to a foldable electronic device.

Aspects of some embodiments of the present disclosure include an electronic device capable of sensing its own folding state.

According to some embodiments of the inventive concept an electronic device including an electronic panel including a first area, a folding area folded with respect to a folding axis defined in a second direction crossing the first direction, and a second area, which are arranged in a first direction, a support layer under the electronic panel and including a folding portion overlapping the folding area and provided with a plurality of holes defined therethrough, a first portion overlapping the first area, and a second portion overlapping the second area, and a folding sensing module including a sensing pad having a conductivity, a driver applying an electrical signal to the sensing pad, and a sensing line connecting the sensing pad and the driver.

According to some embodiments, the folding portion has the conductivity.

According to some embodiments, the electrical signal has a voltage different from a voltage applied to the folding portion.

According to some embodiments, the folding portion receives a ground voltage.

According to some embodiments, the first portion receives a same voltage as the voltage applied to the folding portion.

According to some embodiments, the sensing pad is electrically insulated from the first portion.

According to some embodiments, the electronic device further includes a circuit board electrically connected to the electronic panel. The electronic panel includes a display panel including a plurality of pixels and an input sensor including a plurality of sensor electrodes overlapping the pixels in a plane, the circuit board is electrically connected to each of the display panel and the input sensor, and the driver is electrically connected to the circuit board.

According to some embodiments, the electronic device further includes a flexible board connecting the circuit board and the support layer, and the sensing line is on the flexible board.

According to some embodiments, a minimum separation distance between the first portion and the sensing pad is changed depending on a folding degree of the electronic panel.

According to some embodiments, the holes have a shape that is changed depending on the folding degree of the electronic panel According to some embodiments of the inventive concept, an electronic device includes an electronic panel including a first area, a folding area folded with respect to a folding axis defined in a second direction crossing the first direction, and a second area, which are arranged in a first direction, a support layer under the electronic panel and including a folding portion overlapping the folding area and having a first voltage, a first portion overlapping the first area, and a second portion overlapping the second area, and a folding sensing module including a sensing pad having a second voltage different from the first voltage.

According to some embodiments, the first portion receives a same voltage as the voltage applied to the folding portion.

According to some embodiments, the first voltage is a ground voltage.

According to some embodiments, the folding portion is provided with a plurality of holes defined therethrough, and the holes have a size in plane, which varies due to a folding of the electronic panel.

According to some embodiments, the folding portion includes a metal material.

According to some embodiments, the first portion has the first voltage.

According to some embodiments, the first portion includes a material different from a material of the folding portion.

According to some embodiments, the electronic device further includes a circuit board electrically connected to the electronic panel. The electronic panel includes a display panel including a plurality of pixels and an input sensor overlapping the pixels in a plane and sensing an external input, the circuit board includes a driving circuit electrically connected to the input sensor, and the folding sensing module is electrically connected to the driving circuit.

According to some embodiments, the support layer is electrically connected to the circuit board.

According to some embodiments, the folding sensing module is provided in plural, and the folding sensing modules are attached to the first portion and the second portion, respectively.

According to some embodiments, a display device may be capable of sensing whether or not a foldable electronic panel is folded. In addition, whether the electronic panel is folded or not may be sensed using the display sensing module having a simplified configuration, and thus, a manufacturing cost may be relatively reduced and an assembling process may be relatively simplified.

BRIEF DESCRIPTION OF THE DRAWINGS

The above and other characteristics of some embodiments of the present disclosure will become readily apparent by reference to the following detailed description when considered in conjunction with the accompanying drawings wherein:

FIGS. 7A and 7B are plan views showing a portion of a support layer according to some embodiments of the present disclosure;

FIG. 8B is a plan view showing a portion of a support layer; and

DETAILED DESCRIPTION

Figure 1A:
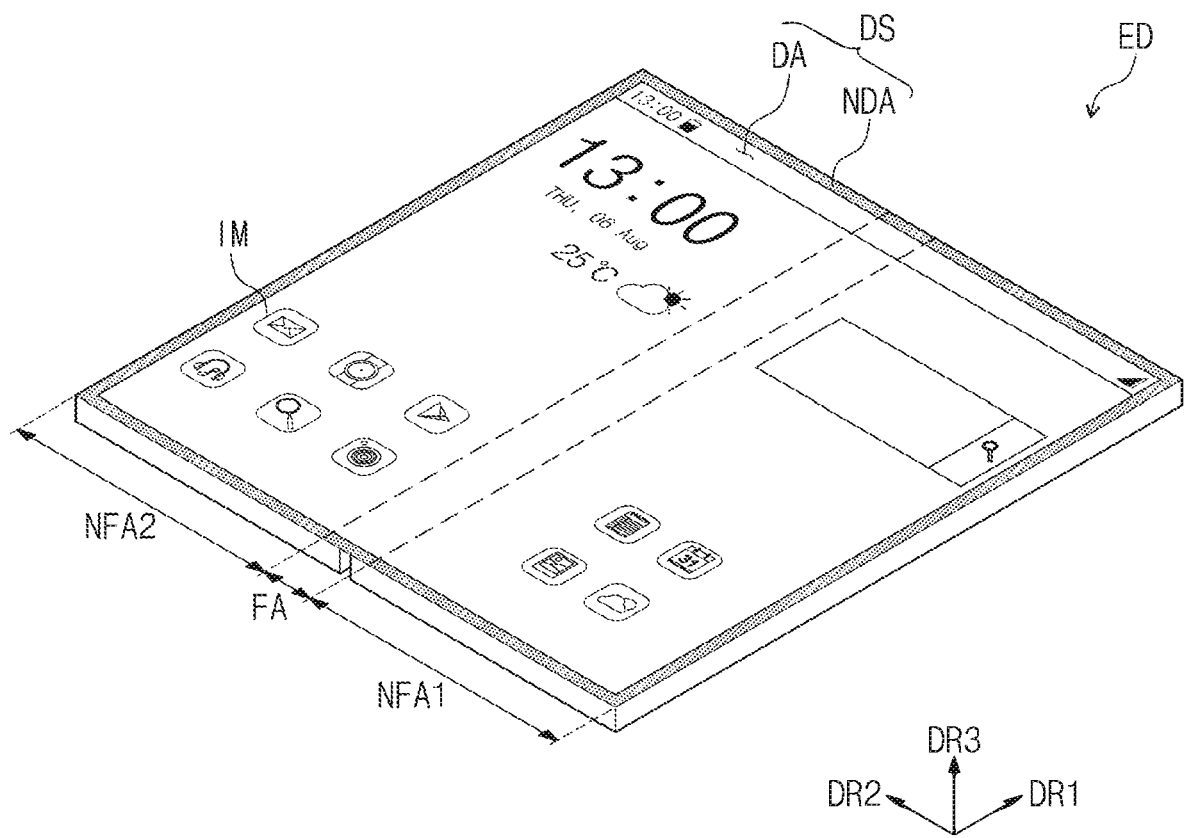
FIGS. 1A and 1B are perspective views showing an electronic device according to some embodiments of the present disclosure.

In the present disclosure, it will be understood that when an element or layer is referred to as being "on", "connected to" or "coupled to" another element or layer, it can be directly on, connected or coupled to the other element or layer or intervening elements or layers may be present.

Like numerals refer to like elements throughout. In the drawings, the thickness, ratio, and dimension of components are exaggerated for effective description of the technical content.

As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another element. Thus, a first element discussed below could be termed a second element without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as illustrated in the figures.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, aspects of some embodiments of the present disclosure will be explained in more detail with reference to the accompanying drawings.

Figure 1B:
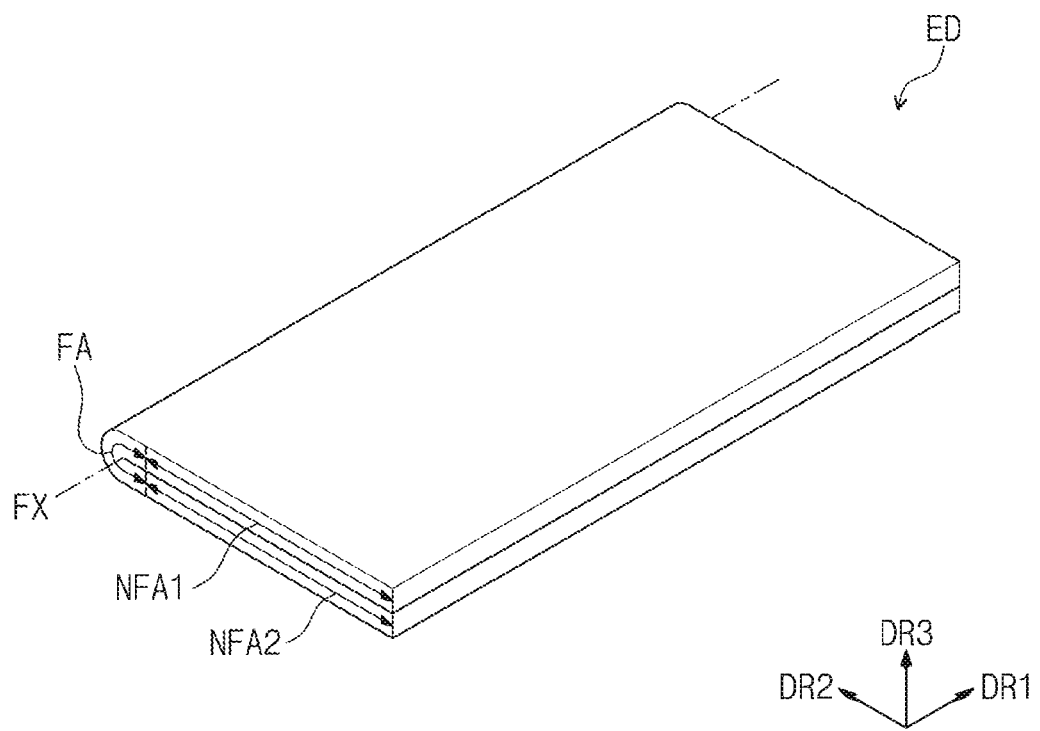

FIGS. 1A and 1B are perspective views showing an electronic device ED according to some embodiments of the present disclosure. FIG. 1A shows the electronic device ED in an unfolded state, and FIG. 1B shows the electronic device ED in a folded state.

Referring to FIGS. 1A and 1B, the electronic device ED may include a display surface DS defined by a first direction DR1 and a second direction DR2 crossing the first direction DR1. The electronic device ED may display an image IM to a user through the display surface DS.

The display surface DS may include a display area DA and a non-display area NDA around the display area DA. The image IM may be displayed at the display area DA and may not be displayed at the non-display area NDA. The non-display area NDA may surround the display area DA such that the non-display area NDA is in periphery (or outside a footprint) of the display area DA, however, embodiments according to the present disclosure are not limited thereto or thereby, and the shape of the display area DA and the shape of the non-display area NDA may be changed to have any suitable shape according to the design of the electronic device ED.

Hereinafter, a direction perpendicular (or normal) to a plane defined by the first direction DR1 and the second direction DR2 may be referred to as a third direction DR3. In the present disclosure, the expression "when viewed in a plane" or "in a plan view" may mean a state of being viewed in the third direction DR3. Hereinafter, the first, second, and third directions DR1, DR2, and DR3 are indicated by first, second, and third directional axes, respectively, and are assigned with the same reference numerals as those of the first, second, and third directional axes.

The electronic device ED may include a folding area FA and a plurality of non-folding areas NFA1 and NFA2. The non-folding areas NFA1 and NFA2 may include a first area NFA1 and a second area NFA2. The first area NFA1, the folding area FA, and the second area NFA2 may be sequentially arranged in the second direction DR2.

As shown in FIG. 1B, the folding area FA may be folded with respect to a folding axis FX extending in the first direction DR1. According to some embodiments, the folding axis FX may be defined substantially parallel to the first direction DR1. The folding area FA may have a curvature (e.g., a set or predetermined curvature) and a radius of curvature. The electronic device ED may be inwardly folded (inner-folding) such that the first area NFA1 and the second area NFA2 may face each other and the display surface DS may not be exposed to the outside.

According to some embodiments, the electronic device ED may be outwardly folded (outer-folding) such that the display surface DS may be exposed to the outside. According to some embodiments, the electronic device ED may be configured to repeatedly perform the inner-folding operation or the outer-folding operation with an unfolding operation. According to some embodiments, the electronic device ED may be configured to selectively perform (e.g., according to user activity) the unfolding operation, the inner-folding operation, and the outer-folding operation.

Figure 2:
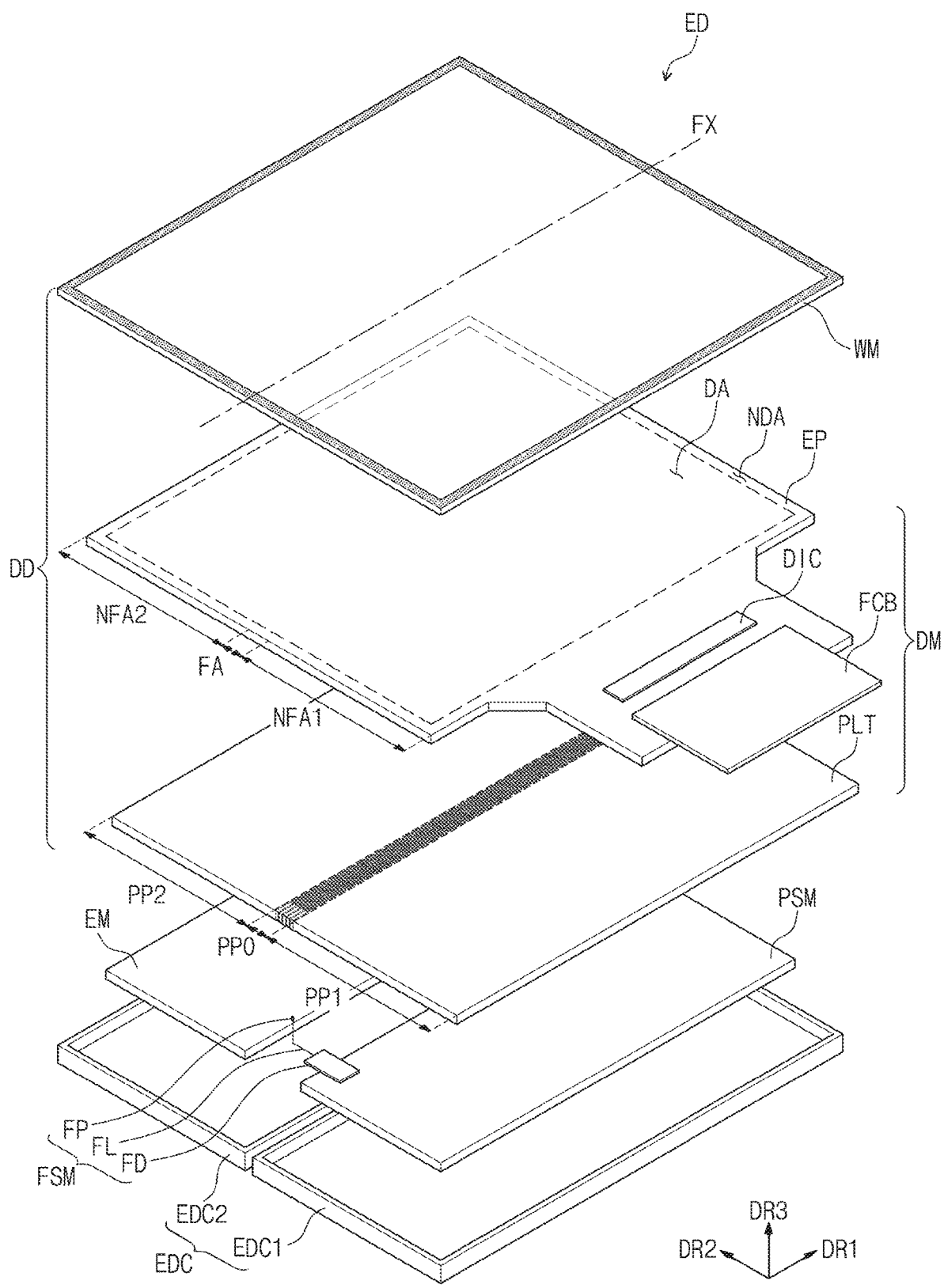
FIG. 2 is an exploded perspective view showing an electronic device according to some embodiments of the present disclosure.

FIG. 2 is an exploded perspective view showing the electronic device ED according to some embodiments of the present disclosure.

Referring to FIG. 2, the electronic device ED may include a display device DD, an electronic module EM, a power module PSM, and a case EDC. According to some embodiments, the power module PSM may further include a mechanical structure to control a folding operation of the display device DD.

The display device DD may generate or display images and may sense an external input (e.g., a touch input) from a user. The display device DD may include a window module WM and a display module DM. The window module WM may provide a front surface of the electronic device ED.

The display module DM may include an electronic panel EP, a driving chip DIC, a circuit board FCB, and a support layer PLT. The electronic panel EP may substantially provide the display area DA and the non-display area NDA of the electronic device ED. The electronic panel EP may display images and may sense the external input (e.g., touch input) at the display area DA. However, this is merely one example, and an area at which images are displayed and an area at which the external input is sensed may be different from each other and embodiments are not particularly limited.

The electronic panel EP may have a flexibility. As an example, the electronic panel EP may perform a folding operation or an unfolding operation with respect to the folding axis FX. The electronic panel EP may include the first area NFA1, the folding area FA, and the second area NFA2, which are arranged in the second direction DR2. The first area NFA1, the folding area FA, and the second area NFA2 may be defined in each layer of the display device DD.

The electronic panel EP may have a flexible property to be folded along the folding axis FX. According to some embodiments, the folding axis FX may have a shape extending in the first direction DR1. The electronic panel EP may include the folding area FA, the first area NFA1, and the second area NFA2, which are distinguished from each other with respect to the folding axis FX when viewed in a plan view. The first area NFA1, the folding area FA, and the second area NFA2 may be sequentially arranged in the second direction DR2.

The folding area FA may be folded with respect to the folding axis FX. When the folding area FA is folded, a tensile stress or a compressive stress is applied to the folding area FA, and thus, a strain that causes a deformation in shape of the folding area FA may occur in the folding area FA. The folding area FA may overlap the folding axis FX in the unfolded state when viewed in a plane.

The first area NFA1 and the second area NFA2 may be spaced apart from each other in the second direction DR2 and may be defined with the folding area FA interposed therebetween. When the electronic device ED is folded, the first area NFA1 and the second area NFA2 may be arranged to overlap each other when viewed in a plan view. As an example, when electronic device ED is inwardly folded, the second area NFA2 may be arranged on the first area NFA1. As another way, when the electronic device ED is outwardly folded, the second area NFA2 may be arranged under the first area NFA1.

The driving chip DIC may be electrically connected to the electronic panel EP. The driving chip DIC may apply electrical signals to the electronic panel EP or may receive electrical signals generate by the electronic panel EP. As an example, the driving chip DIC may include a data driving circuit to drive pixels as described in more detail below.

The driving chip DIC may be mounted on the electronic panel EP, however, this is merely an example and, according to some embodiments, the driving chip DIC may be mounted on the circuit board FCB. However, embodiments according to the present disclosure are not particularly limited.

The circuit board FCB may be electrically connected to the electronic panel EP and the driving chip DIC. As an example, the circuit board FCB may include a driving circuit to drive the pixels or the driving chip DIC. According to some embodiments, the circuit board FCB may include a driving circuit to drive an input sensor described in more detail below.

Meanwhile, according to some embodiments, the display module DM may further include a layer that is arranged under the electronic panel EP to support the electronic panel EP or an adhesive layer that attaches the support layer PLT to the electronic panel EP.

The support layer PLT may be arranged under the electronic panel EP. The support layer PLT may support the electronic panel EP. The support layer PLT may include a material having an elastic modulus equal to or greater than about 60 GPa.

The support layer PLT may include a metal material such as a stainless steel. For example, the support layer PLT may include SUS 304, however, embodiments according to the present disclosure are not limited thereto or thereby. The support layer PLT may include a variety of metal materials.

In addition, the support layer PLT may include a material with relatively high thermal conductivity. Accordingly, a heat dissipation performance of the display device DD may be improved by the support layer PLT.

The support layer PLT may include a first portion PP1, a folding portion PP0, and a second portion PP2, which are arranged in the second direction DR2. The folding portion PP0 may be located between the first portion PP1 and the second portion PP2.

The first portion PP1 may overlap the first area NFA1. The second portion PP2 may overlap the second area NFA2. The folding portion PP0 may overlap the folding area FA. The folding portion PP0 may be conductive or have a conductivity. For example, the folding portion PP0 may include a metal material, a conductive polymer, or a conductive oxide material.

A plurality of holes HH (see, for example, FIG. 7A) may be defined through the folding portion PP0. The folding portion PP0 may have a lattice pattern shape that surrounds the holes HH in the unfolded state. According to some embodiments, because the folding portion PP0 of the support layer PLT, which overlaps the folding area FA, has the lattice pattern, a flexibility of the folding portion PP0 may be improved. Accordingly, the support layer PLT may be relatively easily folded according to the folding operation of the electronic panel EP. This will be described in more detail below.

A folding sensing module FSM may be attached to the display module DM to sense the folding of the display module DM. For example, the folding sensing module FSM may be attached to the support layer PLT and may sense the folding of the support layer PLT, and thus, the folding sensing module FSM may sense whether the electronic panel EP is folded or not and a folding angle of the electronic panel EP.

The folding sensing module FSM may be coupled with at least one of the first portion PP1 or the second portion PP2 of the support layer PLT. For example, the folding sensing module FSM may include a sensing pad FP, a sensing line FL, and a driver FD. The sensing pad FP may be coupled with the support layer PLT. The folding sensing module FSM may sense a separation distance between the sensing pad FP and the folding portion PP0. The separation distance between the sensing pad FP and the folding portion PP0 may be set in various ways, such as a minimum separation distance, a maximum separation distance, an average separation distance, etc., according to a pre-set standard, however, setting only one separation distance may enable relatively improved accuracy. According to some embodiments, the minimum separation distance will be described as a representative example.

The sensing line FL may electrically connect the driver FD to the sensing pad FP. The driver FD may apply electrical signals to the sensing pad FP and may receive electrical signals from the sensing pad FP. The separation distance between the sensing pad FP and the folding portion PP0 may be changed depending on a folding degree. The folding sensing module FSM may sense whether the electronic device ED is folded or not and the folding degree based on the separation distance between the first portion PP1 and the folding portion PP0 or the separation distance between the second portion PP2 and the folding portion PP0. According to some embodiments of the present disclosure, as the folding sensing module FSM that has a relatively simplified configuration is attached to the support layer PLT, the folding of the electronic panel EP may be sensed. Accordingly, a manufacturing cost may be reduced, and an assembling process may be simplified. The folding sensing module FSM will be described in more detail later.

The electronic module EM may include at least a main controller. The electronic module EM may include a wireless communication module, a camera module, a proximity sensor module, an image input module, an audio input module, an audio output module, a memory, an external interface module, and the like. The modules may be mounted on the circuit board or may be electrically connected to each other via a flexible circuit board. The electronic module EM may be electrically connected to the power module PSM.

The main controller may control an overall operation of the electronic device ED. For example, the main controller may activate or deactivate the display device DD to match a user's input. The main controller may control operations of the display device DD and other modules. The main controller may include at least one microprocessor.

The case EDC may accommodate the display module DM, the electronic module EM, and the power module PSM. The case EDC may include two cases EDC1 and EDC2 separated from each other, however, embodiments according to the present disclosure are not limited thereto or thereby. According to some embodiments, the electronic device ED may further include a hinge structure to connect the two cases EDC1 and EDC2 to each other. The cases EDC1 and EDC2 may be coupled with the window module WM. The cases EDC1 and EDC2 may protect the display module DM, the electronic module EM, and the power module PSM, which are accommodated in the cases EDC1 and EDC2.

Figure 3A:
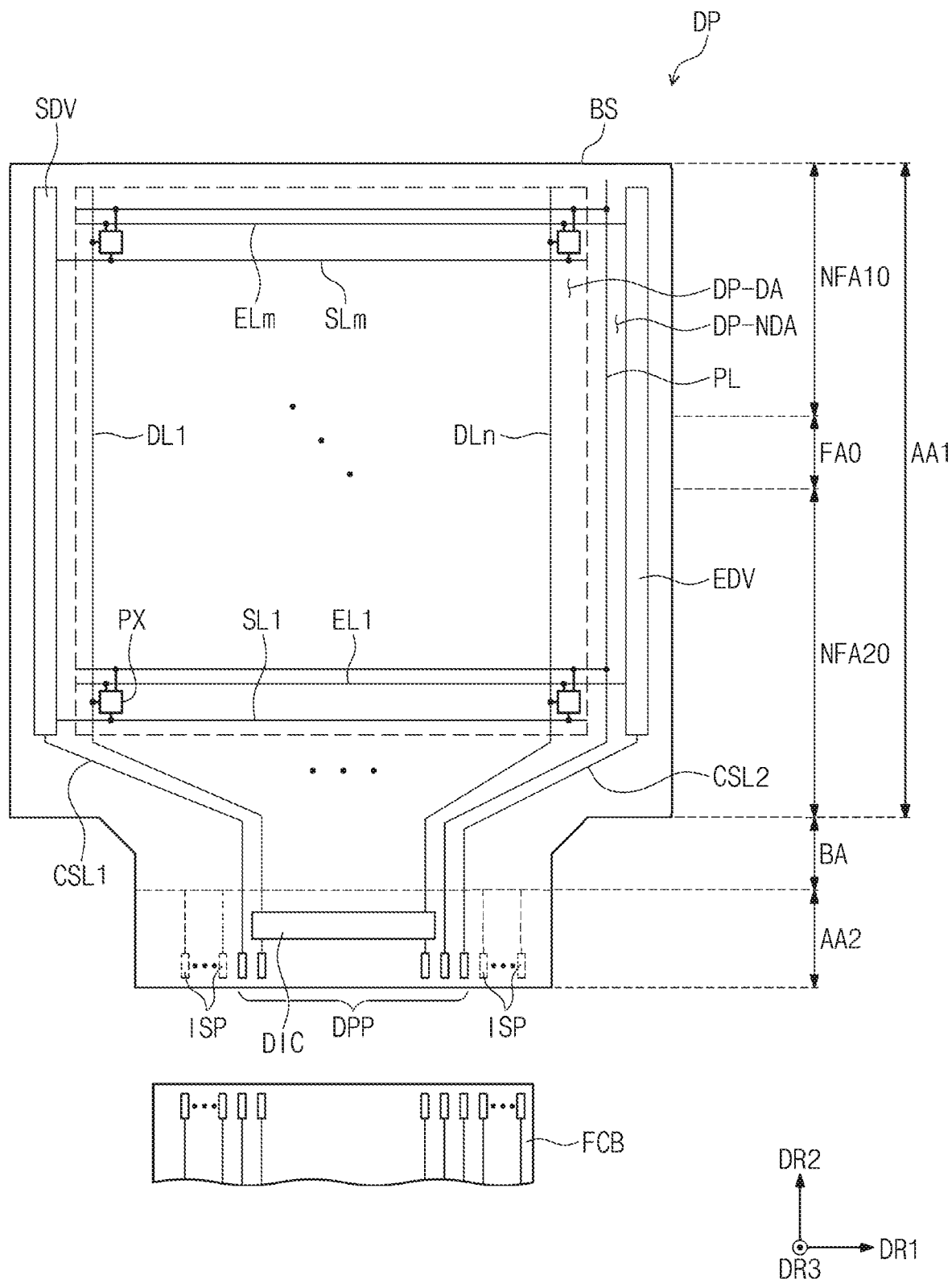
FIGS. 3A and 3B are plan views showing some components of an electronic panel according to some embodiments of the present disclosure.
Figure 3B:
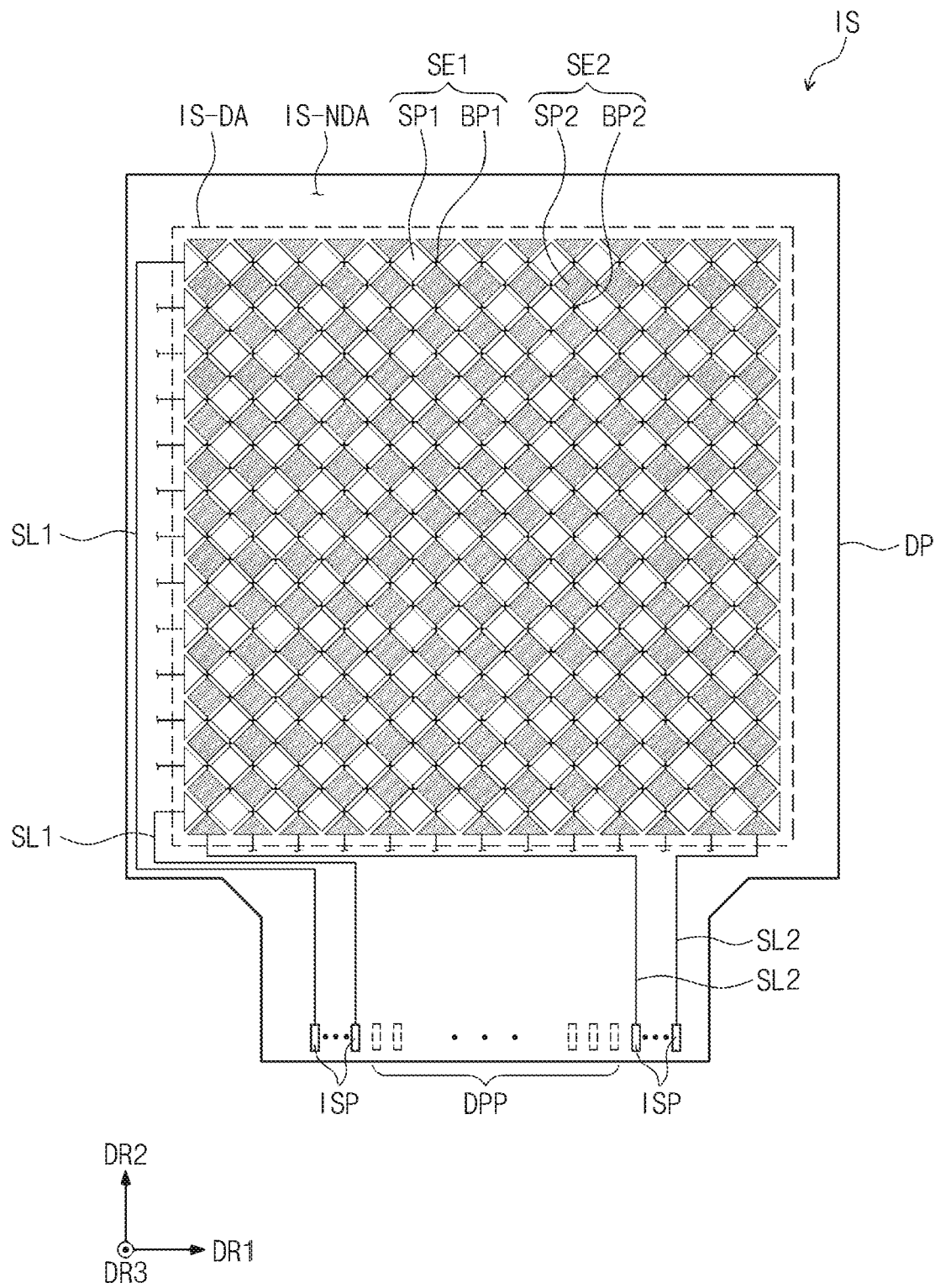

FIGS. 3A and 3B are plan views showing some components of the electronic panel according to some embodiments of the present disclosure. FIG. 3A is a plan view showing the display panel DP of the electronic panel EP, and FIG. 3B is a plan view showing the input sensor IS of the electronic panel EP. Hereinafter, aspects of some embodiments of the present disclosure will be described in more detail with reference to FIGS. 3A and 3B.

The electronic panel EP may include the display panel DP and the input sensor IS. According to some embodiments, the input sensor IS may be arranged directly on the display panel DP, however, this is merely one example. The input sensor IS may be coupled with the display panel DP by an adhesive layer (e.g., a set or predetermined adhesive layer) or may be arranged on a lower surface of the display panel DP, although embodiments according to the present disclosure are not limited thereto or thereby.

The display panel DP may include a base layer BS, a pixel PX, signal lines SL1 to SLm, DL1 to DLn, EL1 to ELm, CSL1, CSL2, and PL, a scan driver SDV, the driving chip DIC, and an emission driver EDV. In addition, the display panel DP may include the base layer BS, a circuit layer, a light emitting element layer, and an encapsulation layer stacked on a cross-section.

The base layer BS may provide a base surface on which the pixel PX is arranged. The base layer BS may be a glass substrate, a metal substrate, or a polymer substrate. However, this is merely one example, and the base layer BS may be an inorganic layer, an organic layer, or a composite material layer and should not be particularly limited.

The base layer BS may have a multi-layer structure. For example, the base layer BS may have a three-layer structure of a synthetic resin layer, an adhesive layer, and a synthetic resin layer. For example, the synthetic resin layer may include a polyimide-based resin. In addition, the synthetic resin layer may include at least one of an acrylate-based resin, a methacrylate-based resin, a polyisoprene-based resin, a vinyl-based resin, an epoxy-based resin, a urethane-based resin, a cellulose-based resin, a siloxane-based resin, a polyamide-based resin, or a perylene-based resin.

The base layer BS may have flexibility. The electronic panel EP may have a shape substantially corresponding to a shape of the base layer BS. The base layer BS may include a first non-bending area AA1, a second non-bending area AA2, and a bending area BA, which are distinguished from each other in the second direction DR2. The second non-bending area AA2 and the bending area BA may be a portion of a non-display area DP-NDA. The bending area BA may be located between the first non-bending area AA1 and the second non-bending area AA2.

The first non-bending area AA1 may correspond to the display surface DS of FIG. 1A. The first non-bending area AA1 may include a first area NFA10, a second area NFA20, and a folding area FA0. The first area NFA10, the second area NFA20, and the folding area FA0 may respectively correspond to the first area NFA1, the second area NFA2, and the folding area FA of the electronic panel EP.

A length in the first direction DR1 of the bending area BA and the second non-bending area AA2 may be smaller than a length in the first direction DR1 of the first non-bending area AA1. As described above, the folding axis FX (refer to FIG. 2) may be defined substantially parallel to the first direction DR1. An area in which a length in a direction of the folding axis is relatively short may be easily bent.

The display panel DP may include a display area DP-DA and the non-display area DP-NDA, which respectively correspond to the display area DA (refer to FIG. 1A) and the non-display area NDA (refer to FIG. 1A). In the present disclosure, the expression "an area/portion corresponds to another area/portion" means that "an area/portion overlaps another area/portion", and the "areas and portions" should not be limited to having the same size as each other. In FIG. 3A, the pixel PX may be arranged in the display area DP-DA, and the scan driver SDV, the driving chip DIC, and the emission driver EDV may be arranged in the non-display area DP-NDA. The driving chip DIC may include a data driver.

Each of the pixels PX may include a light emitting element and a thin film transistor connected to the light emitting element. According to some embodiments, the display area DP-DA and the non-display area DP-NDA may be distinguished from each other by the presence or absence of the light emitting element, however, this is merely one example. According to some embodiments, some of the pixels PX may include the thin film transistor arranged in the non-display area DP-NDA, and embodiments according to the present disclosure are not limited thereto or thereby.

The signal lines SL1 to SLm, DL1 to DLn, EU to ELm, CSL1, CSL2, and PL may include a plurality of scan lines SL1 to SLm, a plurality of data lines DL1 to DLn, a plurality of light emitting lines EU to ELm, first and second control lines CSL1 and CSL2, and a power line PL. Among the signal lines SL1 to SLm, DL1 to DLn, EL1 to ELm, CSL1, CSL2, and PL, the data lines DL1 to DLn, the first and second control lines CSL1 and CSL2, and the power line PL may be connected to a plurality of pads PD. Each of the m and the n is a natural number. The pixels PX may be connected to the scan lines SL1 to SLm, the data lines DL1 to DLn, and the light emitting lines EL1 to ELm.

The scan lines SL1 to SLm may extend in the first direction DR1 and may be connected to the scan driver SDV. The data lines DL1 to DLn may extend in the second direction DR2 and may be connected to the driving chip DIC via the bending area BA. The light emitting lines EL1 to ELm may extend in the first direction DR1 and may be connected to the emission driver EDV.

The power line PL may include a portion extending in the second direction DR2 and a portion extending in the first direction DR1. The portion extending in the first direction DR1 and the portion extending in the second direction DR2 may be arranged on different layers from each other. The portion of the power line PL, which extends in the first direction DR1, may extend to the second non-bending area AA2 via the bending area BA. The power line PL may provide a first voltage to the pixels PX.

The first control line CSL1 may be connected to the scan driver SDV and may extend toward a lower end of the second non-bending area AA2 via the bending area BA. The second control line CSL2 may be connected to the emission driver EDV and may extend toward the lower end of the second non-bending area AA2 via the bending area BA.

In a plan view, the display pads DPP may be arranged adjacent to the lower end of the second non-bending area AA2. The driving chip DIC, the power line PL, the first control line CSL1, and the second control line CSL2 may be connected to display pads DPP. The circuit board FCB may be electrically connected to the display pads DPP via an anisotropic conductive adhesive layer.

Meanwhile, according to some embodiments, sensor pads ISP may be arranged adjacent to the display pads DPP and may be connected to the circuit board FCB. The sensor pads ISP may form the input sensor IS. That is, according to some embodiments, the display panel DP and the input sensor IS may be driven by using one circuit board FCB, however, this is merely one example. According to some embodiments, the sensor pads ISP may be arranged on a layer different from a layer on which the display pads DPP are arranged or may be driven by using another circuit board other than the circuit board FCB, however, embodiments according to the present disclosure are not limited thereto or thereby.

For the convenience of explanation, FIG. 3B shows the input sensor IS formed on the display panel DP. The input sensor IS may include sensor electrodes SE1 and SE2, sensor lines SL1 and SL2, and the sensor pads ISP.

The input sensor IS may include an active area IS-DA and a peripheral area IS-NDA when viewed in a plane. The active area IS-DA may be an area in which the external input is sensed, and substantially, the sensor electrodes SE1 and SE2 may be arranged in the active area IS-DA.

According to some embodiments, the active area IS-DA may overlap the display area DP-DA when viewed in a plane. The active area IS-DA may correspond to the display area DP-DA, and the peripheral area IS-NDA may correspond to the non-display area DP-NDA in a plane, however, this is merely one example. According to some embodiments, the display area DP-DA and the active area IS-DA may be defined not to overlap each other or to partially overlap each other, however, embodiments according to the present disclosure are not limited thereto or thereby.

The sensor electrodes SE1 and SE2 may include first sensor electrodes SE1 and second sensor electrodes SE2 insulated from the first sensor electrodes SE1. The first sensor electrodes SE1 may extend in the first direction DR1 and may be arranged in the second direction DR2. Each of the first sensor electrodes SE1 may include first sensor portions SP1 and first connection portions BP1, which are arranged in the first direction DR1 and electrically connected to each other.

The second sensor electrodes SE2 may extend in the second direction DR2 and may be arranged in the first direction DR1. Each of the second sensor electrodes SE2 may include second sensor portions SP2 and second connection portions BP2, which are arranged in the second direction DR2 and electrically connected to each other. The first connection portions BP1 may be arranged on a layer different from a layer on which the second connection portions BP2 are arranged and may be electrically insulated from the second connection portions BP2.

Meanwhile, this is merely one example, and each of the first sensor electrodes SE1 may be provided as an electrode having an integral shape. Similarly, each of the second sensor electrodes SE2 may be provided as an electrode having an integral shape.

One ends of the first sensor lines SL1 may be connected to the first sensor electrodes SE1, respectively, and one ends of the second sensor lines SL2 may be connected to the second sensor electrodes SE2, respectively. The other ends of the first sensor lines SL1 and second sensor lines SL2 may be connected to the sensor pads ISP. Accordingly, the first sensor lines SL1 and the second sensor lines SL2 may receive independent electrical signals, and the first sensor electrodes SE1 and the second sensor electrodes SE2 may be independently driven.

According to some embodiments, the input sensor IS may sense a position and an intensity of the external input using a mutual capacitance method, however, this is merely one example. According to some embodiments, the input sensor IS may be driven by a self-capacitance method. According to some embodiments, the input sensor IS may be driven by a resistive film method or an optical method, and a driving method of the external input should not be particularly limited as long as the external input is sensed.

Figure 4A:
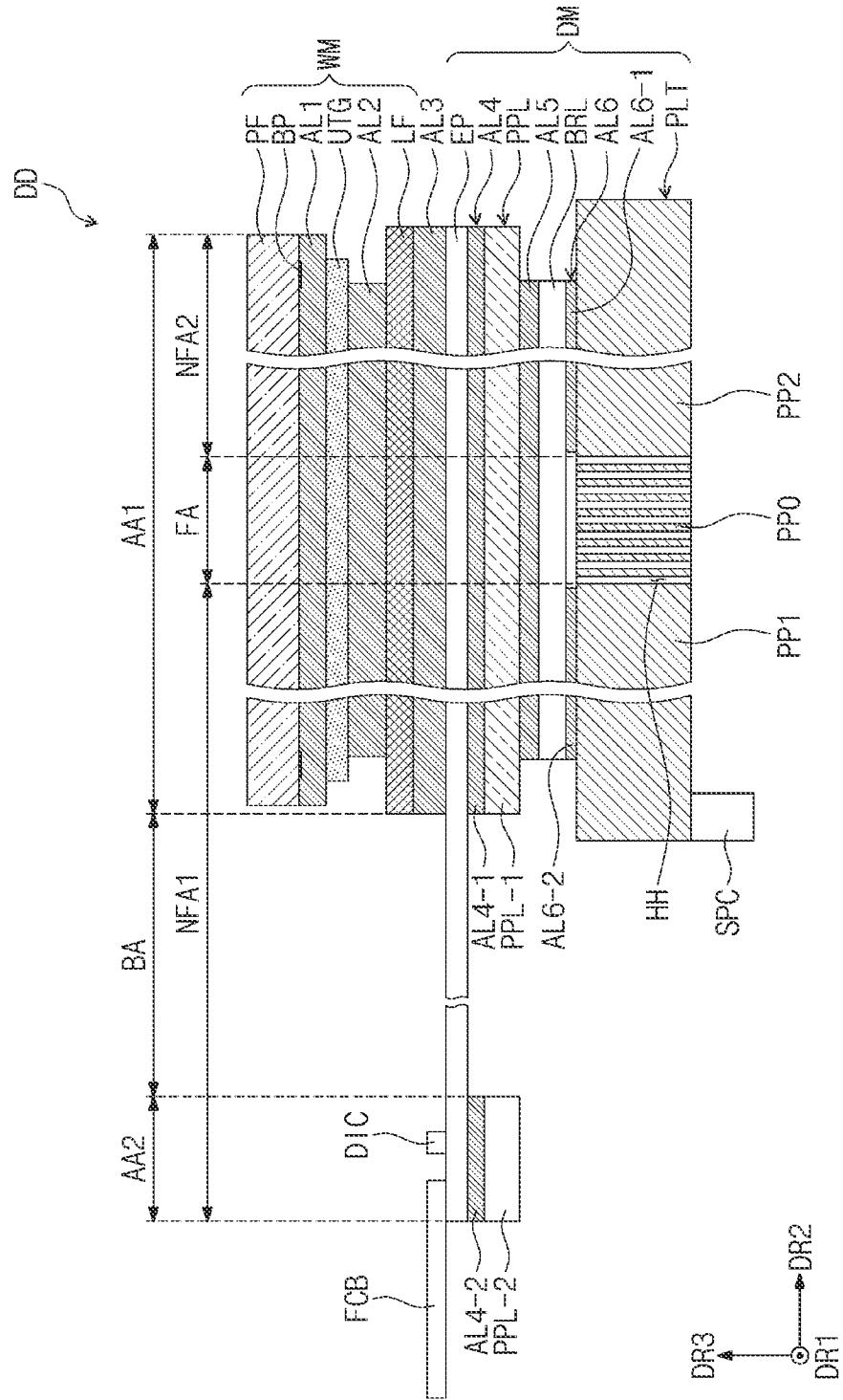
FIGS. 4A and 4B are cross-sectional views showing a display device according to some embodiments of the present disclosure.
Figure 4B:
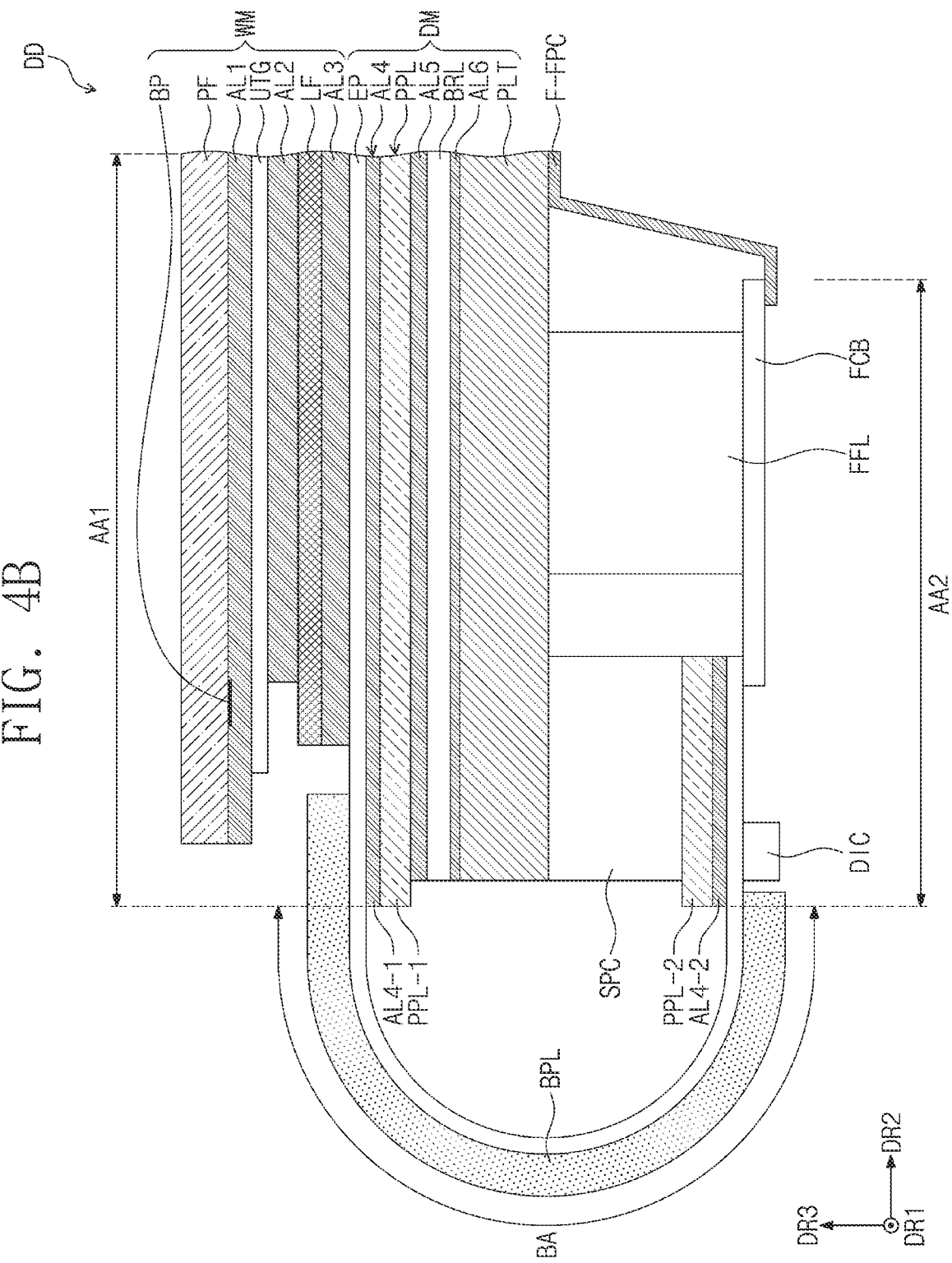

FIGS. 4A and 4B are cross-sectional views showing the display device DD according to some embodiments of the present disclosure. FIG. 4A is a cross-sectional view showing the electronic panel EP before the bending area BA is bent, and FIG. 4B is a cross-sectional view showing the electronic panel EP after the bending area BA is bent. Meanwhile, FIGS. 4A and 4B further show some components which are not illustrated in FIG. 2.

Referring to FIG. 4A, the display device DD may include the window module WM and the display module DM. The window module WM may include a bezel pattern BP, a plastic film PF, a thin glass substrate UTG, and an optical film LF.

The bezel pattern BP may overlap the non-display area DP-NDA (refer to FIG. 3A). The bezel pattern BP may be arranged on one surface of the thin glass substrate UTG or one surface of the plastic film PF. According to some embodiments, the bezel pattern BP is arranged on a lower surface (or a rear surface) of the plastic film PF, however, it should not be limited thereto or thereby. According to some embodiments, the bezel pattern BP may be arranged on an upper surface of the plastic film PF. The bezel pattern BP may be a colored light blocking layer and may be formed by a coating process. The bezel pattern BP may include a base material and a pigment or a dye mixed with the base material.

The thin glass substrate UTG may have a thickness in a range from about 15 μm to about 45 μm. The thin glass substrate UTG may be a chemically strengthened glass. The occurrence of crease in the thin glass substrate UTG may be minimized even though the folding and unfolding operations are repeatedly performed.

The plastic film PF may be arranged on the thin glass substrate UTG. The plastic film PF may have a thickness in a range from about 50 μm to about 80 μm. The plastic film PF may include polyimide, polycarbonate, polyamide, triacetylcellulose, polymethylmethacrylate, or polyethylene terephthalate. According to some embodiments, at least one of a hard coating layer, an anti-fingerprint layer, or an anti-reflective layer may be arranged on the upper surface of the plastic film PF.

A first adhesive layer AL1 may attach the thin glass substrate UTG to the plastic film PF. The first adhesive layer AL1 may be a pressure sensitive adhesive (PSA) film or an optically clear adhesive (OCA). Adhesive layers describe below may be substantially the same as the first adhesive layer AL1 and may include a conventional adhesive.

The optical film LF may be arranged in the first non-bending area AA1 shown in FIG. 4A. The optical film LF may cover at least the display area DP-DA (refer to FIG. 3A). A second adhesive layer AL2 may attach the optical film LF to the thin glass substrate UTG, and a third adhesive layer AL3 may attach the optical film LF to the electronic panel EP.

The plastic film PF, the bezel pattern BP, the thin glass substrate UTG, and the optical film LF may be attached to each other by the adhesive layers. FIG. 4A shows the first adhesive layer AL1, the second adhesive layer AL2, and the third adhesive layer AL3 among the adhesive layers of the window module WM as a representative example.

The first adhesive layer AL1 may be separated from the thin glass substrate UTG. Because a strength of the plastic film PF is lower than that of the thin glass substrate UTG, scratches may occur relatively easily on the plastic film PF. After the first adhesive layer AL1 and the plastic film PF are separated from each other, another plastic film PF may be attached to the thin glass substrate UTG.

The second adhesive layer AL2 and the third adhesive layer AL3 may be arranged on the upper and lower surfaces of the optical film LF, respectively. The second adhesive layer AL2 may attach the optical film LF to the thin glass substrate UTG, and the third adhesive layer AL3 may attach the optical film LF to the electronic panel EP.

The display module DM may be arranged under the window module WM. The display module DM may include the electronic panel EP, a panel protective layer PPL, a barrier layer BRL, the support layer PLT, a spacer SPC, and a conductive film FFL.

The panel protective layer PPL may be arranged under the electronic panel EP. The panel protective layer PPL may protect a lower portion of the electronic panel EP. The panel protective layer PPL may include a flexible plastic material. For example, the panel protective layer PPL may include polyethylene terephthalate. According to some embodiments, the panel protective layer PPL may not be arranged in the folding area FA. A fourth adhesive layer AL4 may attach the panel protective layer PPL to the electronic panel EP, and a fifth adhesive layer AL5 may attach the panel protective layer PPL to the barrier layer BRL.

The panel protective layer PPL may include a first panel protective layer PPL-1 protecting the first non-bending area AA1 of the electronic panel EP and a second panel protective layer PPL-2 protecting the second non-bending area AA2 of the electronic panel EP. When the bending area BA is bent, the second panel protective layer PPL-2 may be arranged under the first non-bending area AA1 and the first panel protective layer PPL-1 with the second non-bending area AA2. Since the panel protective layer PPL is not located in the bending area BA, the bending area BA may be more easily bent. The fourth adhesive layer AL4 may include a first portion AL4-1 corresponding to the first panel protective layer PPL-1 and a second portion AL4-2 corresponding to the second panel protective layer PPL-2.

The barrier layer BRL may be located under the panel protective layer PPL. The barrier layer BRL may increase resistance against a compressive force caused by external pressing. Accordingly, the barrier layer BRL may prevent the display panel DP (refer to FIG. 3A) from being deformed. The barrier layer BRL may include a flexible plastic material, such as polyimide or polyethylene terephthalate. In addition, the barrier layer BRL may be a colored film with low light transmittance. The barrier layer BRL may absorb a light incident thereto from the outside. As an example, the barrier layer BRL may be a black plastic film. When looking at the display device DD from an upper side of the window module WM, components arranged under the barrier layer BRL may not be perceived by the user. The fifth adhesive layer AL5 may attach the panel protective layer PPL to the barrier layer BRL, and a sixth adhesive layer AL6 may attach the barrier layer BRL to the support layer PLT.

The support layer PLT may be arranged under the barrier layer BRL. The support layer PLT may include the material having the elastic modulus equal to or greater than about 60 GPa. The support layer PLT may include a metal material such as a stainless steel. For example, the support layer PLT may include SUS 304, however, it should not be limited thereto or thereby. The support layer PLT may include a variety of metal materials. The support layer PLT may support the display panel DP. In addition, a heat dissipation performance of the display device DD may be improved by the support layer PLT.

A plurality of holes HH may be defined through the folding portion PP0 to overlap the folding area FA. The first portion PP1 of the support layer PLT may support the first area NFA1, the second portion PP2 of the support layer PLT may support the second area NFA2, and the folding portion PP0 of the support layer PLT may support the folding area FA. As the holes HH are defined through the folding portion PP0, the folding portion PP0 may be easily folded to correspond to the electronic panel EP. This will be described in more detail later.

Referring to FIG. 4B, when the bending area BA of the electronic panel EP is bent, the driving chip DIC and the circuit board FCB may be arranged on the lower surface of the support layer PLT. FIG. 4B shows the electronic device ED in an assembled state.

For example, the bending area BA may be bent such that the second non-bending area AA2 may be arranged under the first non-bending area AA1. Accordingly, the driving chip DIC may be arranged under the first non-bending area AA1. As the bending area BA is bent, the second non-bending area AA2 of the electronic panel EP may be arranged on one surface of the spacer SPC. The spacer SPC may prevent or reduce instances of the electronic panel EP colliding with the support layer PLT. In addition, the spacer SPC may prevent excessive bending of the electronic panel EP and may allow the electronic panel EP to maintain a curvature (e.g., a set or predetermined curvature) while being bent. The spacer SPC may have elasticity or rigidity, however, embodiments according to the present disclosure are not limited thereto or thereby.

A bending protective layer BPL may be arranged in at least the bending area BA. The bending protective layer BPL may overlap the bending area BA, the first non-bending area AA1, and the second non-bending area AA2. The bending protective layer BPL may be arranged on a portion of the first non-bending area AA1 and a portion of the second non-bending area AA2.

The bending protective layer BPL may be bent with the bending area BA. The bending protective layer BPL may protect the bending area BA from external impacts and may control a neutral plane of the bending area BA. The bending protective layer BPL may control stress of the bending area BA to allow the neutral plane to be close to the signal lines arranged in the bending area BA.

One surface of the second panel protective layer PPL-2 to which the second portion AL4-2 of the fourth adhesive layer AL4 is not attached may be attached to the spacer SPC.

The conductive film FFL may be arranged between the support layer PLT and the circuit board FCB. The conductive film FFL may be in contact with a rear surface of each of the support layer PLT and the circuit board FCB. A static electricity generated in the circuit board FCB may be diffused and dispersed to the support layer PLT through the conductive film FFL. Accordingly, an electrical reliability of the circuit board FCB may be improved.

Meanwhile, the support layer PLT may receive a voltage (e.g., a set or predetermined voltage) via the conductive film FFL. As an example, the support layer PLT may receive a ground voltage via the rear surface of the circuit board FCB. The voltage transmitted through the conductive film FFL may be supplied to the folding portion PP0 of the support layer PLT, and thus, the folding portion PP0 may have the voltage (e.g., the set or predetermined voltage).

Meanwhile, according to some embodiments, the electronic device may further include a folding circuit board F-FPC. The folding circuit board F-FPC may electrically connect the folding sensing module FSM (refer to FIG. 2) to the circuit board FCB.

The folding circuit board F-FPC may be a circuit film including an insulating film and a line mounted on the insulating film. As an example, the circuit board FCB may be a flexible board on which the sensing line FL (refer to FIG. 2) of the folding sensing module FSM is mounted. The folding circuit board F-FPC may be electrically connected to the circuit board FCB. The folding circuit board F-FPC may electrically connect the folding sensing module FSM to the circuit board FCB. Accordingly, the sensing line FL of the folding sensing module FSM may be mounted on the folding circuit board F-FPC and may electrically connect the circuit board FCB to the sensing pad FP (refer to FIG. 2).

According to some embodiments, the folding circuit board F-FPC may be a flexible board on which the driver FD (refer to FIG. 2) of the folding sensing module FSM is mounted. In this case, the folding circuit board F-FPC may electrically connect the driver FD of the folding sensing module FSM and the driving circuit of the electronic panel EP.

However, this is merely one example, and according to some embodiments, the folding circuit board F-FPC may be omitted. In this case, the sensing line FL of the folding sensing module FSM may be connected to the driver FD provided in a separate circuit board, and thus, the folding sensing module FSM and the circuit board FCB may be independently driven from each other. According to some embodiments, the electronic device may be implemented in various ways and should not be particularly limited.

Figure 5A:
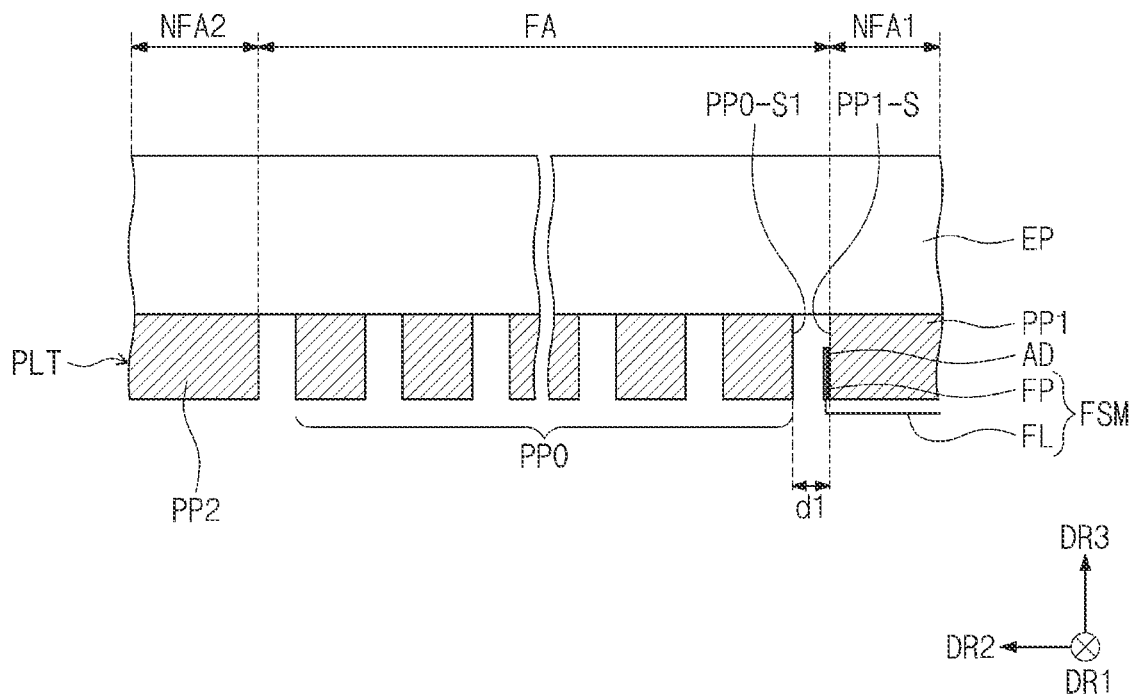
FIGS. 5A and 5B are cross-sectional views showing a portion of an electronic device according to some embodiments of the present disclosure.
Figure 5B:
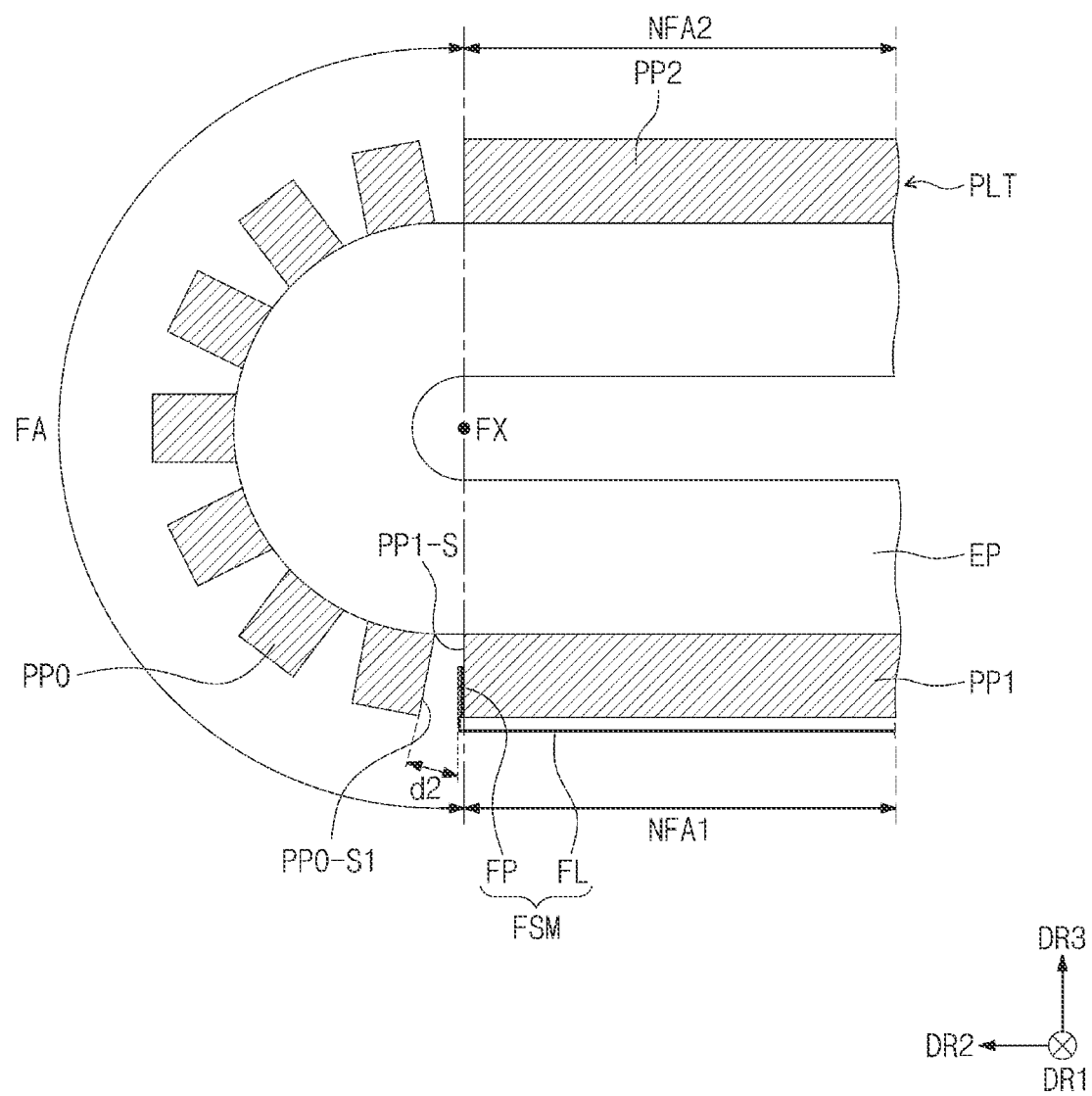
Figure 6:
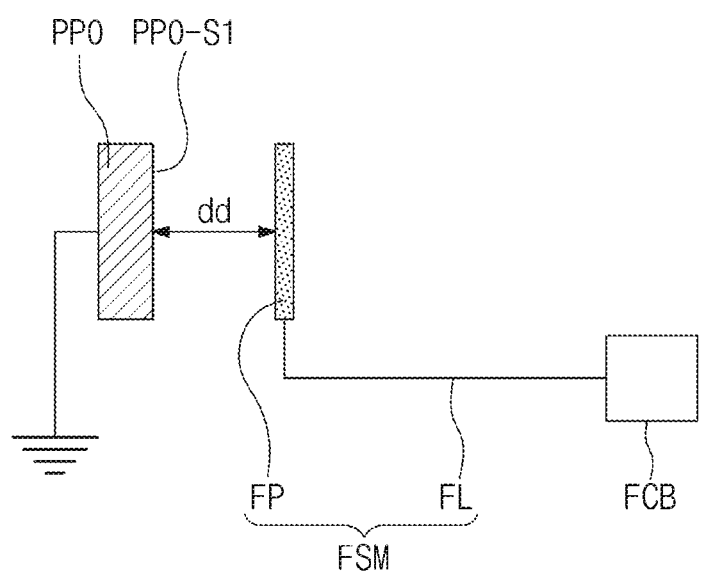
FIG. 6 is a view schematically showing a folding sensing module according to some embodiments of the present disclosure.

FIGS. 5A and 5B are cross-sectional views showing a portion of an electronic device according to some embodiments of the present disclosure. FIG. 6 is a view schematically showing a folding sensing module according to some embodiments of the present disclosure. For the convenience of explanation, FIGS. 5A and 5B show only the electronic panel EP, the support layer PLT, and the folding sensing module FSM, FIG. 5A is a cross-sectional view showing the electronic panel EP in the unfolded state, and FIG. 5B is a cross-sectional view showing electronic panel EP in the folded state. In FIGS. 5A, 5B, and 6, the same reference numerals denote the same elements in FIGS. 1A to 4B, and thus, some detailed descriptions of the same or similar elements may be omitted.

According to some embodiments, the support layer PLT may have an electrical conductivity. The folding portion PP0 may have the first voltage. The first voltage may have various voltage levels, for example, the ground voltage.

According to some embodiments, the first portion PP1 and the second portion PP2 may be physically and electrically coupled with the folding portion PP0. Accordingly, the first portion PP1 and the second portion PP2 may have substantially the same voltage level as that of the folding portion PP0.

The folding sensing module FSM may be coupled with the first portion PP1 of the support layer PLT. For example, the sensing pad FP of the folding sensing module FSM may be arranged on a surface PP1-S (hereinafter, referred to as an attachment surface) of the first portion PP1 facing the folding portion PP0.

The sensing pad FP may be coupled with the attachment surface PP1-S by an adhesive layer (e.g., a set or predetermined adhesive layer) AD. The adhesive layer AS may include various materials as long as it has an insulating property and physically couples the sensing pad FP to the first portion PP1. As an example, the adhesive layer AD may include an optical clear adhesive (OCA), an optical clear resin (OCR), a photopolymer resin, a thermosetting resin, or a silicon resin.

The sensing pad FP may have a similar shape as that of the sensor pads ISP (refer to FIG. 3B). That is, as the folding sensing module FSM includes the simplified sensing pad FP, the processes may be simplified, and the ability to assemble the components may be improved.

The sensing pad FP may be coupled with the first portion PP1 by the adhesive layer AS, and thus, the sensing pad FP may be electrically insulated from the first portion PP1, however, this is merely one example. In a case where the first portion PP1 has an insulating property, the sensing pad FP may be directly coupled with the first portion PP1 without employing the adhesive layer AD and should not be particularly limited.

Referring to FIG. 6, a voltage (e.g., a set or predetermined voltage), e.g., a ground voltage, may be applied to the folding portion PP0, and the sensing pad FP spaced apart from the folding portion PP0 by a separation distance dd may form a capacitance (e.g., a set or predetermined capacitance) with the folding portion PP0. The capacitance may be changed depending on a variation in the separation distance dd between the sensing pad FP and the folding portion PP0. As shown in FIGS. 5A and 5B, the separation distance dd between the sensing pad FP and the folding portion PP0 may be a first distance d1 in the unfolded state of the electronic panel EP and may be a second distance d2 different from the first distance d1 in the folded state of the electronic panel EP. The first distance d1 or the second distance d2 may correspond to an average distance between the sensing pad FP and a surface PP0-S1 (hereinafter, referred to as a sensing surface) of the folding portion PP0 facing the first portion PP1.

Even though the electronic panel EP is folded, an area of the sensing pad FP or the sensing surface PP0-S1 may be maintained at the same value, however, the separation distance may be changed. Accordingly, the capacitance between the sensing pad FP and the folding portion PP0 may be changed. A driver of the folding sensing module FSM may sense the change in the capacitance, and thus, the folding sensing module FSM may sense whether the electronic panel EP is folded or not and the folding angle.

According to some embodiments, the sensing pad FP may be electrically connected to the circuit board FCB via the sensing line FL. That is, the driver of the folding sensing module FSM may be mounted on the circuit board FCB. Meanwhile, according to some embodiments, the sensing pad FP may be electrically connected to the driving circuit of the input sensor IS (refer to FIG. 3B). Accordingly, a separate driving circuit for the folding sensing module FSM may not be utilized, and thus, the cost may be reduced.

In addition, as the folding sensing module FSM is controlled using the circuit board FCB, the electronic panel EP and the folding sensing module FSM may be controlled using a single circuit board. As an example, the electronic device ED (refer to FIGS. 1A and 1B) may control the electronic panel EP to be turned off when the electronic panel EP is sensed as in the folded state through the folding sensing module FSM and may control the electronic panel EP to be turned on when the electronic panel EP is sensed as in the unfolded state through the folding sensing module FSM. Accordingly, a power consumption in the electronic device ED may be reduced, and damages on elements, which are caused by deterioration, may be prevented. As another way, for example, a size of the image displayed through the electronic panel EP may be controlled or a size of the active area of the input sensor may be controlled according to the folding angle of the electronic panel EP, which is sensed though the folding sensing module FSM.

However, this is merely one example, the folding sensing module FSM may be electrically connected to the driving circuit of the display panel DP (refer to FIG. 3A) or may include a driver independently of the circuit board FCB, and it should not be limited thereto or thereby.

Figure 7A:
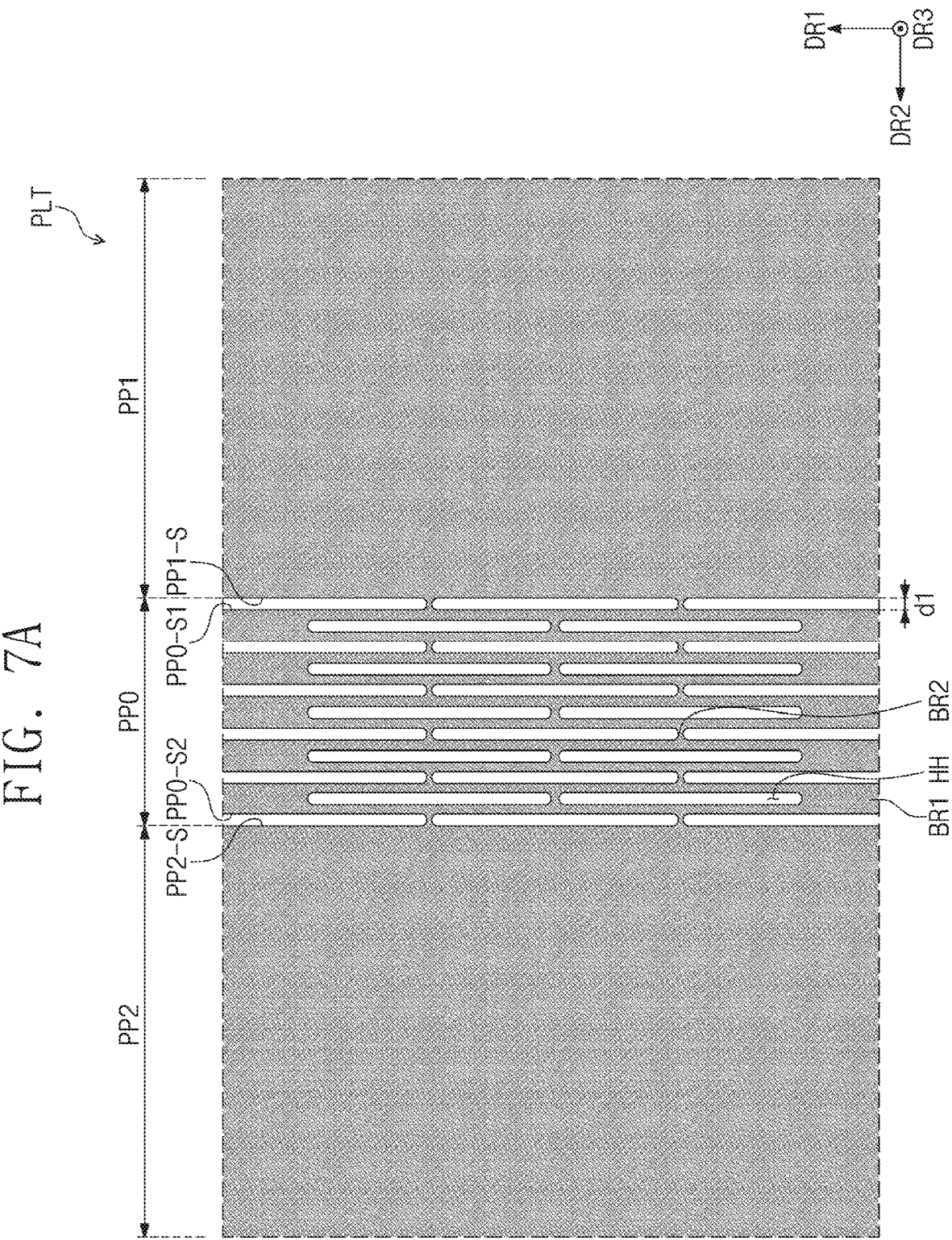

FIGS. 7A and 7B are plan views showing a portion of support layers PLT according to some embodiments of the present disclosure. FIG. 7A shows the electronic panel EP (refer to FIG. 2) in the unfolded state as shown in FIG. 5A. FIG. 7B shows the support layer PLT shown in FIG. 7A after being stretched left and right along the second direction DR2 and corresponds to the folded state of FIG. 5B.

Referring to FIG. 7A, the folding portion PP0 of the support layer PLT may have a lattice shape when viewed in a plane. For example, the folding portion PP0 may include a plurality of first branches BR1 and a plurality of second branches BR2. Each of the first branches BR1 may extend in the first direction DR1. The first branches BR1 may be substantially parallel to the folding axis FX shown in FIG. 1.

The second branches BR2 may be arranged between the first branches BR1. For example, each of the second branches BR2 may extend in the second direction DR2. Each of the second branches BR2 may extend from portions of two first branches BR1 adjacent to each other in the first direction DR1. The first branches BR1 may be connected to each other by the second branches BR2.

The second branches BR2 may be located between the first portion PP1 and a first branch BR1 closest to the first portion PP1 among the first branches BR1. The second branches BR2 may be located between the second portion PP2 and a first branch BR1 closest to the second portion PP2 among the first branches BR1. Consequently, the folding portion PP0 may be connected to the first portion PP1 and the second portion PP2 by the second branches BR2.

The first and second branches BR1 and BR2 may surround the holes HH and may define the lattice shape. Meanwhile, each of the holes HH may be defined to have a bar shape whose opposite ends are rounded, however, this is merely one example. According to some embodiments, each of the holes HH may have a circular shape, an oval shape, a polygonal shape, or the like and embodiments according to the present disclosure are not particularly limited.

Referring to FIG. 7B, when the electronic panel EP is folded, the support layer PLT may be folded to correspond to the electronic panel EP. The shape of the folding portion PP0 may be changed due to the stress or bending of the material caused by the folding operation. Accordingly, a shape of holes HH-F (hereinafter, referred to as "holes in the folded state") may be changed. Each of the holes HH-F in the folded state may have a size greater than a size of the holes HH in the unfolded state. According to some embodiments of the present disclosure, as the shape of the holes HH is changed, the folding portion PP0 may be easily folded.

Meanwhile, a separation space between the attachment surface PP1-S and the sensing surface PP0-S1 may correspond to one of the holes HH and HH-F. In addition, the separation distances d1 and d2 between the attachment surface PP1-S and the sensing surface PP0-S1 may substantially correspond to the separation distance between the sensing pad FP (refer to FIGS. 5A and 5B) of the folding sensing module FSM (refer to FIGS. 5A and 5B) and the folding portion PP0. When the size of the separation space between the attachment surface PP1-S and the sensing surface PP0-S1 is changed, the separation distances d1 and d2 may be changed, and the capacitance value measured by the folding sensing module FSM may be changed. The capacitance value may include information about whether the electronic panel EP is folded or not and the folding angle of the electronic panel EP. According to some embodiments of the present disclosure, as the folding sensing module FSM is inserted into the support layer PLT, the folding of the electronic device ED (refer to FIGS. 1A and 1B) and the folding angle of the electronic device ED (refer to FIGS. 1A and 1B) may be easily sensed.

Figure 8A:
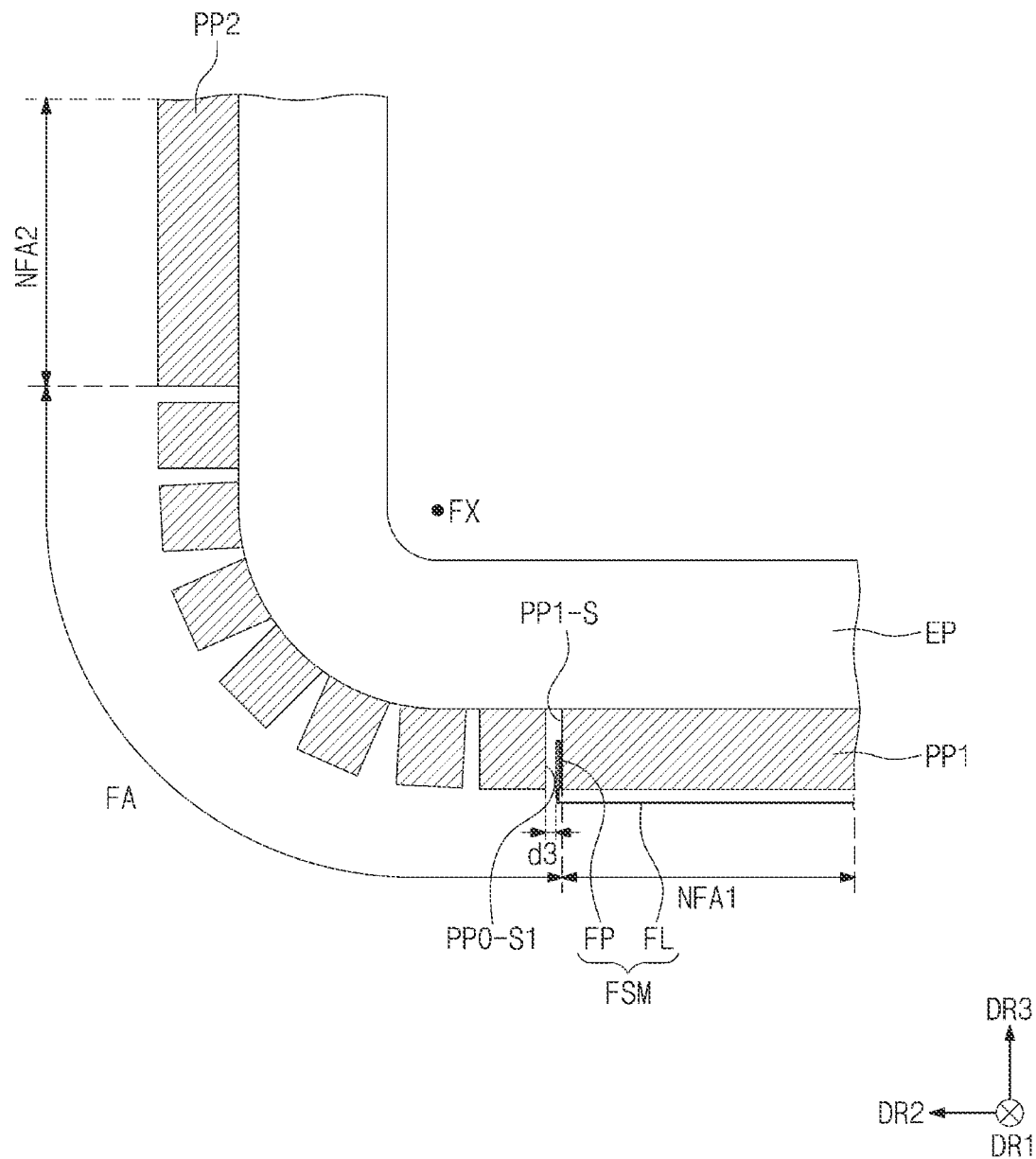
FIG. 8A is a cross-sectional view showing an electronic device according to some embodiments of the present disclosure.

FIG. 8A is a cross-sectional view showing a portion of an electronic device according to some embodiments of the present disclosure, and FIG. 8B is a plan view showing a portion of a support layer PLT. FIG. 8A shows an electronic panel EP that is folded at an angle (e.g., a set or predetermined angle) in an area corresponding to that of FIG. 5B. FIG. 8B shows the support layer PLT stretched to correspond to the electronic panel EP shown in FIG. 8A.

Referring to FIGS. 8A and 8B, a separation distance d3 between a sensing pad FP and a sensing surface PP0-S1 may be changed variously depending on a folding angle of the electronic panel EP. The folding angle of the electronic panel EP shown in FIG. 8A may be smaller than about 180 degrees, which is the folding angle of the electronic panel EP shown in FIG. 5B, and may be greater than about zero (0) degrees, which is the folding angle of the electronic panel EP shown in FIG. 5A. FIG. 8A shows the electronic panel EP that is folded at a folding angle of about 90 degrees.

In this case, holes HH-F1 may have a shape and a size, which are different from those of the holes HH shown in FIG. 7A or the holes HH-F shown in FIG. 7B. The separation distance d3 between the sensing pad FP and the sensing surface PP0-S1 may be different from the separation distances d1 and d2. The folding sensing module FSM may sense a variation in capacitance between the folding portion PP0 and the sensing pad FP based on a difference in the separation distance d3, and thus, the folding sensing module FSM may sense whether the electronic panel EP is folded or not and the folding angle of the electronic panel EP.

Figure 9A:
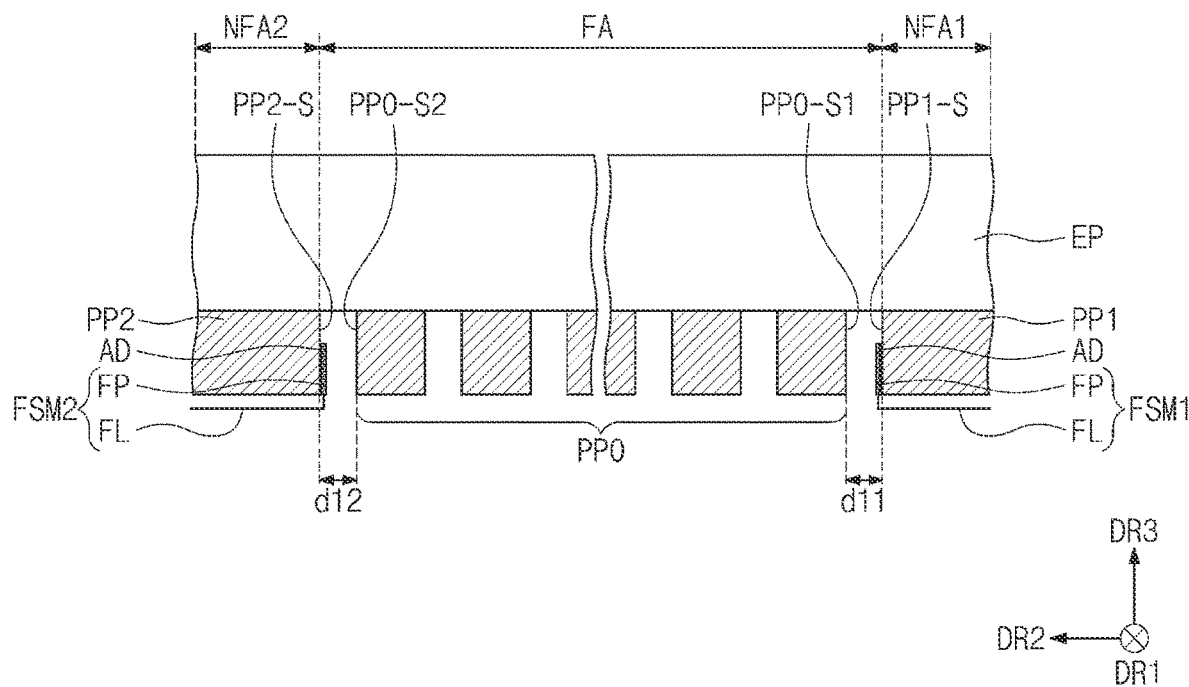
FIGS. 9A and 9B are cross-sectional views showing a portion of an electronic device according to some embodiments of the present disclosure.
Figure 9B:
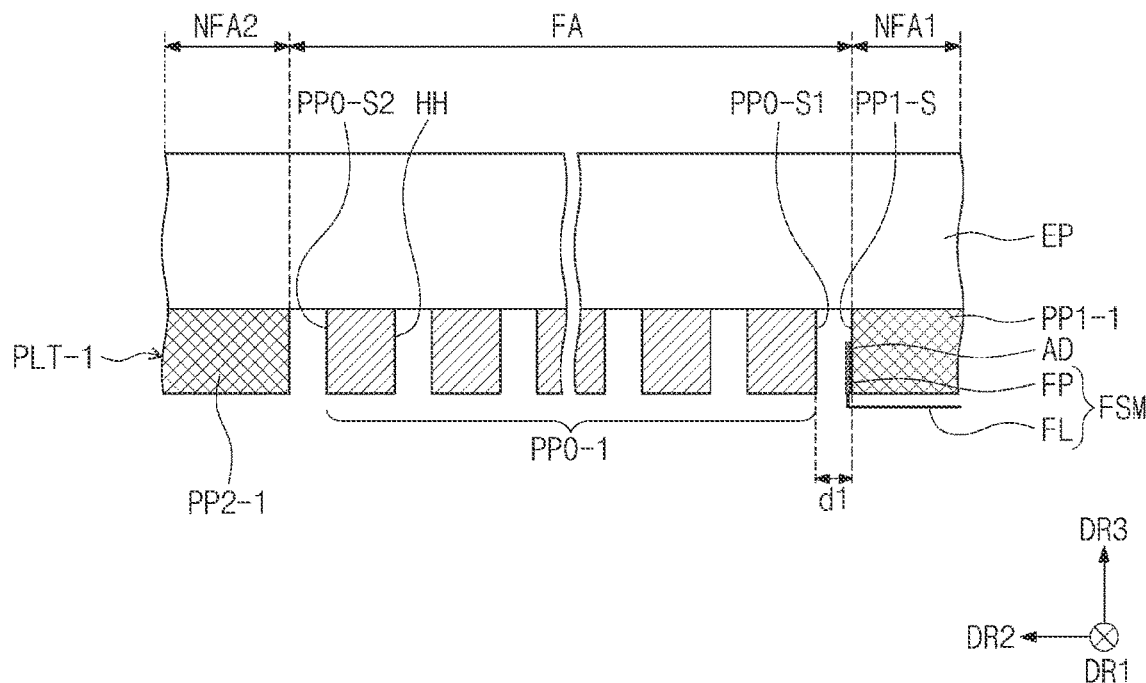

FIGS. 9A and 9B are cross-sectional views showing a portion of an electronic device according to some embodiments of the present disclosure. FIGS. 9A and 9B show cross-sections corresponding to FIG. 5A. In FIGS. 9A and 9B, the same reference numerals denote the same elements in FIGS. 1A to 7B, and thus, some detailed descriptions of the same elements may be omitted.

Referring to FIG. 9A, a folding sensing module FSM1 and FSM2 may be provided in plural. A first folding sensing module FSM1 may be coupled with a first portion PP1, and a second folding sensing module FSM2 may be coupled with a second portion PP2. The first folding sensing module FSM1 may be arranged on an attachment surface PP1-S of the first portion PP1 to sense a distance d11 to a sensing surface PP0-S1. The first folding sensing module FSM1 may sense a folding angle between the first portion PP1 and a folding portion PP0.

The second folding sensing module FSM2 may be located on an attachment surface PP2-S of the second portion PP2 to sense a distance d12 to a sensing surface PP0-S2. The second folding sensing module FSM2 may sense a folding angle between the second portion PP2 and the folding portion PP0. According to some embodiments of the present disclosure, as the folding sensing modules FSM1 and FSM2 are respectively arranged on the first portion PP1 and the second portion PP2, a folding degree of a first area NFA1 and a folding degree of a second area NFA2 may be independently sensed.

As another way, referring to FIG. 9B, a support layer PLT-1 may include a first portion PP1-1 and a second portion PP2-1, which are electrically separated from a folding portion PP0-1. The first portion PP1-1 and the second portion PP2-1 may receive a voltage different from that applied to the folding portion PP0-1.

Meanwhile, the first portion PP1-1 and the second portion PP2-1 may have an electrical insulating property. When the first portion PP1-1 has the electrical insulating property, an adhesive layer AD may be omitted. In this case, a sensing pad FP may be directly formed on or directly attached to an attachment surface PP1-S.

According to some embodiments of the present disclosure, a folding sensing module FSM may not be affected by electrical characteristics of the first portion PP1-1 as long as the folding sensing module FSM is attached to the attachment surface PP1-S of the first portion PP1-1 and senses the change in separation distance to a sensing surface PP0-S1. Accordingly, even though the first portion PP1-1 is electrically or physically separated from the folding portion PP0-1, formed of a different material from the folding portion PP0-1, or has a different voltage from the folding portion PP0-1, the folding sensing module FSM may stably sense the folding angle of the electronic panel EP.

Although aspects of some embodiments of the present disclosure have been described, it is understood that the present disclosure should not be limited to these embodiments but various changes and modifications can be made by one ordinary skilled in the art within the spirit and scope of the present disclosure as hereinafter claimed. Therefore, the disclosed subject matter should not be limited to any single embodiment described herein, and the scope of the present inventive concept shall be determined according to the attached claims, and their equivalents.

What is claimed is:

1. An electronic device comprising:
 an electronic panel comprising a first area, a folding area, and a second area, arranged along a first direction, the folding area being folded with respect to a folding axis defined in a second direction crossing the first direction;
 a support layer under the electronic panel and comprising a folding portion overlapping the folding area and provided with a plurality of holes defined therethrough, a first portion overlapping the first area, and a second portion overlapping the second area; and
 a folding sensing module comprising a sensing pad being electrically conductive, a driver configured to apply an electrical signal to the sensing pad, and a sensing line connecting the sensing pad and the driver.

2. The electronic device of claim 1, wherein the folding portion is electrically conductive.

3. The electronic device of claim 2, wherein the electrical signal has a voltage different from a voltage applied to the folding portion.

4. The electronic device of claim 3, wherein the folding portion is configured to receive a ground voltage.

5. The electronic device of claim 3, wherein the first portion is configured to receive a same voltage as the voltage applied to the folding portion.

6. The electronic device of claim 5, wherein the sensing pad is electrically insulated from the first portion.

7. The electronic device of claim 1, further comprising a circuit board electrically connected to the electronic panel, wherein the electronic panel comprises:
a display panel comprising a plurality of pixels; and
an input sensor comprising a plurality of sensor electrodes overlapping the pixels in a plane, the circuit board is electrically connected to each of the display panel and the input sensor, and the driver is electrically connected to the circuit board.

8. The electronic device of claim 7, further comprising a flexible board connecting the circuit board and the support layer, wherein the sensing line is on the flexible board.

9. The electronic device of claim 1, wherein a minimum separation distance between the first portion and the sensing pad is changed depending on a folding degree of the electronic panel.

10. The electronic device of claim 9, wherein the holes have a shape that is changed depending on the folding degree of the electronic panel.

11. An electronic device comprising:
an electronic panel comprising a first area, a folding area, and a second area, arranged along a first direction, the folding area being folded with respect to a folding axis defined in a second direction crossing the first direction;
a support layer under the electronic panel and comprising a folding portion overlapping the folding area and configured to have a first voltage, a first portion overlapping the first area, and a second portion overlapping the second area; and
a folding sensing module comprising a sensing pad configured to have a second voltage different from the first voltage.

12. The electronic device of claim 11, wherein the first portion is configured to receive a same voltage as the folding portion.

13. The electronic device of claim 12, wherein the first voltage is a ground voltage.

14. The electronic device of claim 11, wherein the folding portion is provided with a plurality of holes defined therethrough, and the holes have a size in a plan view that varies according to a folding of the electronic panel.

15. The electronic device of claim 14, wherein the folding portion comprises a metal material.

16. The electronic device of claim 15, wherein the first portion is configured to have the first voltage.

17. The electronic device of claim 15, wherein the first portion comprises a material different from a material of the folding portion.

18. The electronic device of claim 11, further comprising a circuit board electrically connected to the electronic panel, wherein the electronic panel comprises:
a display panel comprising a plurality of pixels; and
an input sensor overlapping the pixels in a plan view and configured to sense an external input, the circuit board comprising a driving circuit electrically connected to the input sensor, wherein the folding sensing module is electrically connected to the driving circuit.

19. The electronic device of claim 18, wherein the support layer is electrically connected to the circuit board.

20. The electronic device of claim 11, wherein the folding sensing module is provided in plural, and the folding sensing modules are attached to the first portion and the second portion, respectively.

* * * * *